(12) United States Patent
Wada et al.

(10) Patent No.: US 11,707,669 B2
(45) Date of Patent: Jul. 25, 2023

(54) PROGRAM, CONTROL METHOD, AND INFORMATION PROCESSING APPARATUS

(71) Applicant: GREE, Inc., Tokyo (JP)

(72) Inventors: Nariaki Wada, Tokyo (JP); Masao Kajikawa, Tokyo (JP)

(73) Assignee: GREE, Inc., Tokyo (JP)

( * ) Notice: Subject to any disclaimer, the term of this patent is extended or adjusted under 35 U.S.C. 154(b) by 55 days.

(21) Appl. No.: 17/706,995

(22) Filed: Mar. 29, 2022

(65) Prior Publication Data

US 2022/0219073 A1 Jul. 14, 2022

Related U.S. Application Data

(63) Continuation of application No. 16/845,212, filed on Apr. 10, 2020, now Pat. No. 11,318,371, which is a
(Continued)

(30) Foreign Application Priority Data

Aug. 18, 2016 (JP) .................................. 2016-160731

(51) Int. Cl.
*A63F 13/214* (2014.01)
*G06F 3/04815* (2022.01)
(Continued)

(52) U.S. Cl.
CPC ............ *A63F 13/214* (2014.09); *A63F 13/25* (2014.09); *A63F 13/56* (2014.09); *G06F 3/04815* (2013.01); *G06F 3/04883* (2013.01)

(58) Field of Classification Search
None
See application file for complete search history.

(56) References Cited

U.S. PATENT DOCUMENTS 6,157,372 A * 12/2000 Blackburn ........... B60N 2/0228
345/157
9,833,706 B2 12/2017 Ohta
(Continued)

FOREIGN PATENT DOCUMENTS

JP 2007130367 A 5/2007
JP 2013-208269 A 10/2013
(Continued)

OTHER PUBLICATIONS

Japanese Office Action dated Jul. 24, 2018 of corresponding application No. JP2017-144736; 9 pages.
(Continued)

*Primary Examiner* — Peter J Iannuzzi
(74) *Attorney, Agent, or Firm* — Maier & Maier, PLLC

(57) ABSTRACT

An information processing apparatus, which may include a display unit that displays a virtual space, an operating unit that outputs input operation data associating an input operation of a user with coordinate information, and a storage unit that stores the input operation data and may execute a game where a character moves based on the input operation. The information processing apparatus may retrieve the input operation data from the storage unit, perform control including moving the character in a predetermined direction when the input operation is determined to be a first input operation and when the input operation is determined to be the second input operation, and may determine that the input operation is the second input operation when a distance, in the predetermined direction, between an intermediate point and an end or start point is larger than a distance in the predetermined direction between the start and end point.

20 Claims, 6 Drawing Sheets

Related U.S. Application Data continuation of application No. 15/679,553, filed on Aug. 17, 2017, now Pat. No. 10,653,946.

(51) Int. Cl.
*A63F 13/56* (2014.01)
*A63F 13/25* (2014.01)
*G06F 3/04883* (2022.01)

(56) References Cited

U.S. PATENT DOCUMENTS

| | | | |
|---|---|---|---|
| 10,391,399 B2 | 8/2019 | Soejima et al. | |
| 10,901,549 B2 | 1/2021 | Ichikawa et al. | |
| 2006/0019752 A1 | 1/2006 | Ohta | |
| 2008/0026843 A1* | 1/2008 | Nakasaka | A63F 13/2145 463/37 |
| 2008/0291173 A1 | 11/2008 | Suzuki | |
| 2012/0007882 A1 | 1/2012 | Sakurai et al. | |
| 2012/0240041 A1 | 9/2012 | Lim et al. | |
| 2012/0306775 A1* | 12/2012 | Miyachi | A63F 13/2145 345/173 |
| 2013/0154974 A1 | 6/2013 | Murata | |
| 2013/0282637 A1* | 10/2013 | Costigan | G06N 5/022 706/46 |
| 2015/0072784 A1 | 3/2015 | Lee | |
| 2015/0231491 A1 | 8/2015 | Hwang et al. | |
| 2016/0175714 A1 | 6/2016 | Ishii | |

FOREIGN PATENT DOCUMENTS

| | | |
|---|---|---|
| JP | 2015-123244 A | 7/2015 |
| JP | 5873592 B1 | 3/2016 |
| JP | 2016051266 A | 4/2016 |
| WO | 2015/083267 A1 | 6/2015 |

OTHER PUBLICATIONS

Office Action corresponding application No. JP2016-160731 dated Dec. 13, 2016; 10 pages.
Office Action corresponding application No. JP2016-160731 dated Apr. 11, 2017; 5 pages.
Japanese Office Action dated Nov. 4, 2020 of corresponding application No. JP2019-235481; 10 pages.
4gamer.net [online], The basic operation of "Katamari Damacy Nobita" Tamakorogashi, the outline of "Prince Action", and wonderful song information will be released. Let's hold down the operation method using the touch screen, Published: Oct. 27, 2020, Searched: Oct. 20, 2011, URL: https://www.4gamer.net/games/140/G014050/20111024028/.
Japanese Office Action dated Mar. 9, 2021 of corresponding application No. JP2019-235481; 7 pages.

* cited by examiner

PROGRAM, CONTROL METHOD, AND INFORMATION PROCESSING APPARATUS

CROSS-REFERENCE TO RELATED APPLICATIONS

This application claims priority from U.S. patent application Ser. No. 16/845,212, filed on Apr. 10, 2020, entitled "Program, control method, and information processing apparatus," which claims priority to U.S. patent application Ser. No. 15/679,553, now U.S. Pat. No. 10,653,946, filed on Aug. 17, 2017, which in turn claims priority to Japanese Patent Application No. JP2016-160731, the entire contents of which are hereby incorporated by reference.

BACKGROUND OF THE INVENTION

Field of the Invention

The present invention relates to a program, a control method, and an information processing apparatus.

Description of the Related Art

Games in which a character arranged in a virtual space moves and performs an action in accordance with a user operation are known. For example, a game in which a character operated by a user (hereinafter referred to as a "user character") is moved, and the user character fights a battle with an enemy character is disclosed in JP-A-2007-130367.

In recent years, games can increasingly be executed on information processing apparatuses equipped with a touch panel such as smartphones. However, when the game is operated using the touch panel, operability is not necessarily sufficient. For example, a game in which a user character is moved in a virtual space (virtual game space) having a depth is known. In a case in which emphasis is put on an intuitive operation in such a game, both a backward movement and a jump may be performed in accordance with a user operation of moving a finger upwards on the touch panel. In this case, when the user performs an operation with an intent of moving the user character backwards, an unintended jump may be performed.

In the technology disclosed in JP-A-2007-130367, an operation region is divided into a first region and a second region, and an operation of the first region and an operation of the second region are assigned to different actions of the user character (a backward movement and a jump in the above example). However, the user who is playing a game usually pays attention to a region on which the user character is displayed. For this reason, the user who is playing a game often performs an operation without looking at the operation region. In this case, the first region and the second region may be erroneously operated, and thus it is difficult to resolve confusion of different actions of the user character. Therefore, there is room for improvement in game operability.

SUMMARY OF THE INVENTION

In light of the foregoing, it is an object of the invention to provide a program, a control method, and an information processing apparatus which are capable of improving the game operability.

In order to solve the above problems, a program according to an exemplary embodiment may cause an information processing apparatus including a display unit that may display a virtual space, an operating unit that may receive an input operation of a user and may output input operation data in which the input operation may be associated with coordinate information, and a storage unit that may store the input operation data, and executes a game including a character which may be arranged in the virtual space and moved in accordance with the input operation to execute:

a step of retrieving the input operation data from the storage unit;

a first movement step of performing first movement control including moving the character in a predetermined direction when the input operation is determined to be a first input operation;

a second movement step of performing second movement control which may be different from the first movement control and may include moving the character in the predetermined direction when the input operation is determined to be a second input operation different from the first input operation; and a step of determining the input operation to be the second input operation when a distance in the predetermined direction from an intermediate point between a start point at which the input operation starts and an end point at which the input operation ends to the end point or a distance in the predetermined direction from the intermediate point to the start point is larger than a distance in the predetermined direction from the start point to the end point.

Further, a control method according to an exemplary embodiment may be a method of controlling a game which may be executed by an information processing apparatus including a display unit that may display a virtual space, an operating unit that may receive an input operation of a user and may output input operation data in which the input operation may be associated with coordinate information, and a storage unit that may store the input operation data, the game including a character being arranged in the virtual space and moved in accordance with the input operation, and may include:

a step of retrieving the input operation data from the storage unit;

a step of performing first movement control including moving the character in a predetermined direction when the input operation is determined to be a first input operation;

a step of performing second movement control which may be different from the first movement control and may include moving the character in the predetermined direction when the input operation is determined to be a second input operation different from the first input operation; and a step of determining the input operation to be the second input operation when a distance in the predetermined direction from an intermediate point between a start point at which the input operation starts and an end point at which the input operation ends to the end point or a distance in the predetermined direction from the intermediate point to the start point may be larger than a distance in the predetermined direction from the start point to the end point.

Further, an information processing apparatus may be an information processing apparatus that executes a game including a character which may be arranged in the virtual space and moved in accordance with an input operation of a user, and may include:

a display unit that may display the virtual space;

an operating unit that may receive the input operation and may output input operation data in which the input operation may be associated with coordinate information;

a storage unit that may store the input operation data; and a control unit, wherein the control unit may retrieve the input operation data from the storage unit, the control unit may perform first movement control including moving the character in a predetermined direction when the input operation is determined to be a first input operation, the control unit may perform second movement control which may be different from the first movement control and may include moving the character in the predetermined direction when the input operation may be determined to be a second input operation different from the first input operation, and the control unit may determine the input operation to be the second input operation when a distance in the predetermined direction from an intermediate point between a start point at which the input operation starts and an end point at which the input operation ends to the end point or a distance in the predetermined direction from the intermediate point to the start point is larger than a distance in the predetermined direction from the start point to the end point.

According to some exemplary embodiments of the program, the control method, and the information processing apparatus of, the game operability may be improved.

DETAILED DESCRIPTION OF THE INVENTION

Hereinafter, an exemplary embodiment of the invention will be described.

(Configuration of Information Processing Apparatus)

Figure 1:
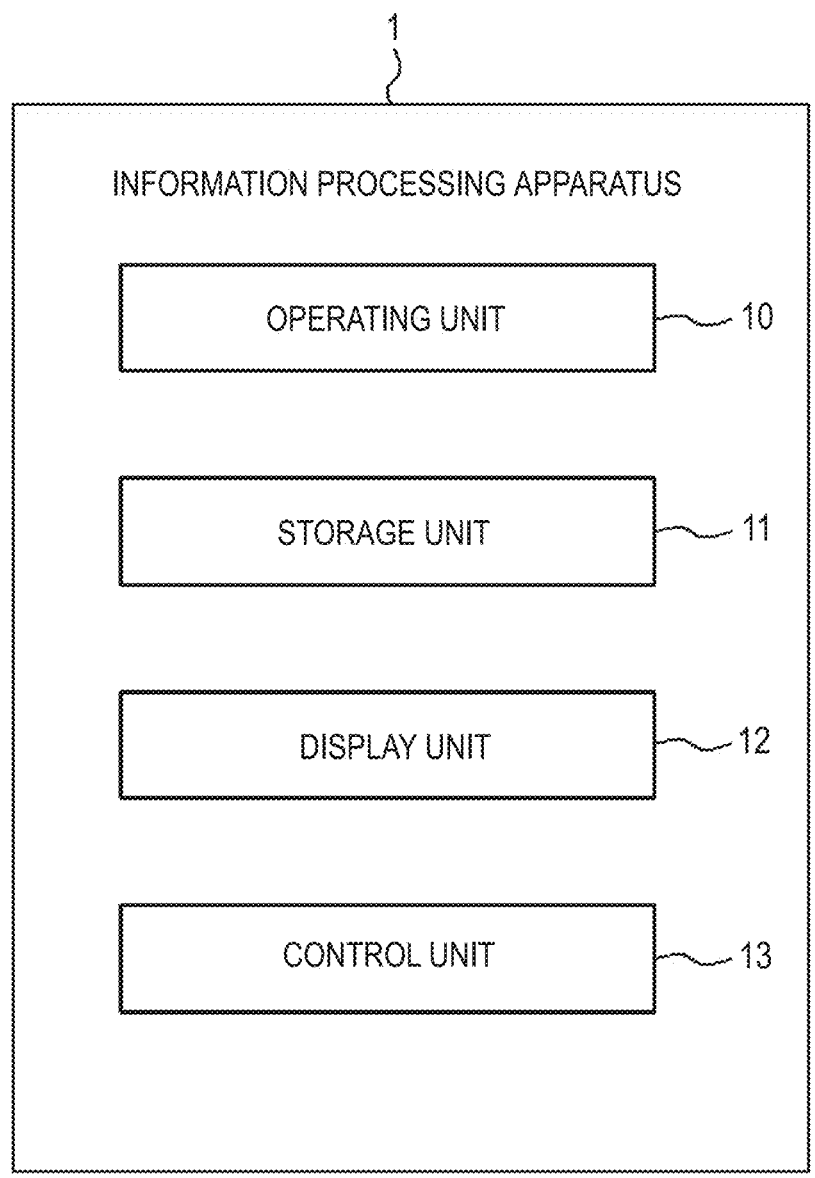
FIG. 1 is a block diagram of an information processing apparatus according to an exemplary embodiment.

An information processing apparatus 1 according to an exemplary embodiment may be described with reference to FIG. 1. The information processing apparatus 1 may be, for example, a smart phone, a PC, or a game device and may be capable of executing a game application (program). The game application may be received from a predetermined application distribution server via the Internet or may be stored in a storage device installed in the information processing apparatus 1 or a storage medium such as a memory card readable by the information processing apparatus 1 in advance.

Here, an overview of the game application (hereinafter referred to as a "game of the present embodiment") executed by the information processing apparatus 1 according to the present embodiment will be described. The game of the present embodiment may be, for example, an action role playing game, and a game medium may move on a field in the game.

The game medium may be electronic data used in the game and may include any medium such as a card, an item, a character, an avatar, or an object. Further, the game medium may be electronic data that can be retrieved, possessed, used, managed, exchanged, synthesized, enhanced, sold, discarded, and/or granted by the user in the game. For example, when the game medium is associated with an ID specific to the user, the game medium may be retrieved, possessed, granted, or transferred to the user in the game. A usage form of the game medium may not be limited to those described in this specification.

The game of the present embodiment may roughly include the following content. The user may make the game progress while operating the user character and traversing the field in the game. Specifically, the user character may move on the field in accordance with the user operation. In the field, for example, a town and a battle stage may be provided. For example, the user character may be able to talk with a resident character of the town or fight a battle with an enemy character encountered within a battle stage. In the field in the game, various events corresponding to areas occur. As the events are executed, a main story of the game may progress. Further, for example, when the user character wins a battle with the enemy character, the game medium such as an item, a virtual currency, or a character can be given to the user. The user character may be able to use the given game medium.

At the battle stage of the game of the present embodiment, a passage along which the user character can move may be provided. Specifically, a passage extending in a horizontal direction of a screen may be provided. In the present embodiment, the user character may move within the passage in a direction at a speed according to the user operation. Further, the passage may have a constant width in a vertical direction of the screen. The user character may be able to move within the passage not only in the horizontal direction of the screen but also the vertical direction.

Here, the user character may be able to jump in addition to the movement within the passage. The user character may be able to quickly move to a position near the enemy character of an attack target by moving or jumping and avoid an attack from the enemy character. The information processing apparatus 1 according to the present embodiment appropriately may determine whether an input operation of the user may be a step movement instruction or a jump instruction and provides a game with excellent operability, and the details thereof will be described later. Here, the vertical direction of the screen corresponds to a predetermined direction of an exemplary embodiment.

Here, components of the information processing apparatus 1 may now be described. The information processing apparatus 1 may include an operating unit 10, a storage unit 11, a display unit 12, and a control unit 13.

The operating unit 10 may receive the input operation of the user and may output input operation data in which the input operation may be associated with coordinate information. As described above, the information processing apparatus 1 executes the game in which the user character may move on the field in accordance with the user operation. The input operation of the user may be an operation by which the user may cause the user character in the virtual space to move on the field and perform a desired operation and include an operation of instructing a behavior of the user character. In the information processing apparatus 1 according to the present embodiment, the operating unit 10 may be a touch panel which may be integrated with the display unit 12. For example, the information processing apparatus 1 may have a configuration in which a transparent sensor layer that serves as the operating unit 10 and detects a change in capacitance may be stacked on a liquid crystal display (LCD) layer that serves as the display unit 12 (a configuration in which the user views the LCD layer via the sensor layer). The operating unit 10 may be able to detect a position touched by the user by detecting a change in capacitance. The operating unit 10 may employ a touch panel other than a capacitive type touch panel.

The user may instruct the behavior of the user character by touching the operating unit 10 using a finger or a tool such as a stylus. In the game of the present embodiment, the user may cause the user character to move on the field (passage) through a swipe operation. The swipe operation may be an operation in which the user touches the operating unit 10 with a finger and then may move the finger in a touched state. Further, the user may cause the user character to perform the step movement or the jump through a flick operation. The flick operation may be an operation in which the user touches the operating unit 10 with a finger and then separates the finger from the operating unit 10 while quickly moving the finger in a touched state. The flick operation may include a V flick operation to be described later. Further, the step movement may be a movement of the user character which may be faster than a normal movement of the user character. Further, the user may be able to attack the enemy character through a tap operation. The tap operation may be an operation in which the user touches the operating unit 10 with a finger and then separating the finger without moving the finger. Here, when the input operation such as the swipe operation, the flick operation, or the tap operation may be executed, a point at which the user brings a finger into contact with the operating unit 10 and starts the input operation may be referred to a "start point." Further, when the user terminates the input operation, a point at which the user separates the finger touching the operating unit 10 may be referred to as an "end point."

The operating unit 10 may associate the start point, the end point, and input trajectories of the swipe operation and the flick operation with the coordinate information in the touch panel. The start point, the end point, and the input trajectories associated with the coordinate information may be output to the storage unit 11 as the input operation data. In the information processing apparatus 1 according to the present exemplary embodiment, coordinates of an orthogonal coordinate system in which the horizontal direction of the screen of the display unit 12 integrated with the operating unit 10 is set as an X axis, and the vertical direction is set as a Y axis may be used. The input operation data also may include information of a period of time from the start of the input operation to the end.

The storage unit 11 may be, for example, a storage device and may store the input operation data. Further, the storage unit 11 may store various pieces of information and programs (game applications) which may be necessary for a process of the game. Further, the storage unit 11 may store various images (texture images) for projecting (texture mapping) various objects arranged in a three-dimensional virtual space. For example, the storage unit 11 may store an image of the user character. Further, the storage unit 11 may store images such as buildings, walls, trees, and non-player characters (NPCs). Further, the storage unit 11 may store an image of a background (background image) such as the sky or a distant view. Further, the storage unit 11 may store images of fields (field images) such as a town and a battle stage. In the present exemplary embodiment, the storage unit 11 temporarily may store the input operation data. The storage of data other than the input operation data may be not temporary, and the data may be stored in the storage unit 11, for example, until the game may be uninstalled.

The display unit 12 may display the virtual space (virtual game space) in which the user character may be arranged. In the present exemplary embodiment, the display unit 12 may be an LCD layer of the touch panel, but may not be limited thereto. For example, the display unit 12 may be a display device such as an organic EL display.

The control unit 13 may be a dedicated microprocessor or a CPU that reads a specific program and implements a specific function. The control unit 13 may control the operation of the information processing apparatus 1. For example, the control unit 13 may execute the game application in accordance with the user operation performed on the operating unit 10. Further, the control unit 13 may perform various processes related to the game.

The control unit 13 may cause the virtual space including, for example, the field and the user character to be displayed on the display unit 12. Further, the control unit 13 may cause the user character to move relatively to the field object such as the passage or perform an action in the virtual space in accordance with the input operation of the user. Hereinafter, the screen of the game of the present embodiment may be described, and then a technique of determining the input operation of the user through control unit 13 and movement control of the user character according to the determined input operation may be described.

(Game Screen Example)

The virtual space displayed on the display unit 12 of the information processing apparatus 1 according to the present embodiment may be described with reference to FIG. 2. The display unit 12 may have a first display region 121 and a second display region 120. The first display region 121 mainly may display a field including the user character and the enemy character in the virtual space. The first display region 121 may have a larger area than the second display region 120. The second display region 120 mainly may display a field including neither the user character nor the enemy character in the virtual space. The second display region 120 may be mainly used as a region in which the operation of the user may be received. For example, the second display region 120 may display a menu selection icon and a user level of a game setting. When the user may perform the input operation on the second display region 120, the user character who may perform a behavior in accordance with the input operation may be displayed on the first display region 121. It may be preferable to set the second display region 120 below the first display region 121 (a lower side of the screen in the vertical direction). Since the user may perform the input operation in the second display region 120, it may be possible to prevent the user character from being hidden by the operation of the user. Further, since the operation region may be set below the lower side close to the user, the thumb reaches the operation region even when the operation may be performed while holding the information processing apparatus 1 with one hand. Therefore, the user may be able to easily perform an operation even with one hand. As described above, the display unit 12 constitutes the touch panel in which the entire display unit 2 may be integrated with the operating unit 10. Therefore, the user may be able to perform the input operation not only in the second display region 120 but also in the first display region 121. For example, when a plurality of enemy characters may be displayed on the first display region 121, the user may perform an attack by tapping one enemy character set as an attack target.

Here, a virtual XY plane generated by an X axis in the horizontal direction of the screen and the Y axis in the vertical direction may be set in the display unit 12. The operating unit 10 integrated with the display unit 12 may generate the input operation data by associating information of coordinates of the XY plane with the input operation of the user. In the example of FIG. 2, in order to move the user character, the user may perform the swipe operation having a linear trajectory 124 in a positive X-axis direction from a start point 122 to an end point 123. At this time, the operating unit 10 may generate the input operation data by associating the start point 122 with coordinates (X0, Y0), associating the end point 123 with coordinates (X1, Y0), and associating at least one intermediate point on the trajectory 124 between the start point and the end point with coordinates (Xa, Y0). The operating unit 10 may output the input operation data to the storage unit 11. The storage unit 11 may store the input operation data. Then, the control unit 13 may retrieve the input operation data from the storage unit 11, may determine content of the input operation of the user from the coordinate information, and may calculate a change (an action or a movement) in the user character on the virtual space on the basis of the content of the input operation (using the coordinate information as well if necessary). Then, the virtual space after the change of the user character may be displayed on the display unit 12. In the example of FIG. 2, the control unit 13 may determine that the input operation may be the swipe operation in the positive X-axis direction, and may cause the user character to move in the virtual space in the positive X-axis direction in accordance with a distance (|X1-X0|) between the start point 122 and the end point 123 and displayed on the display unit 12.

Figure 3A:
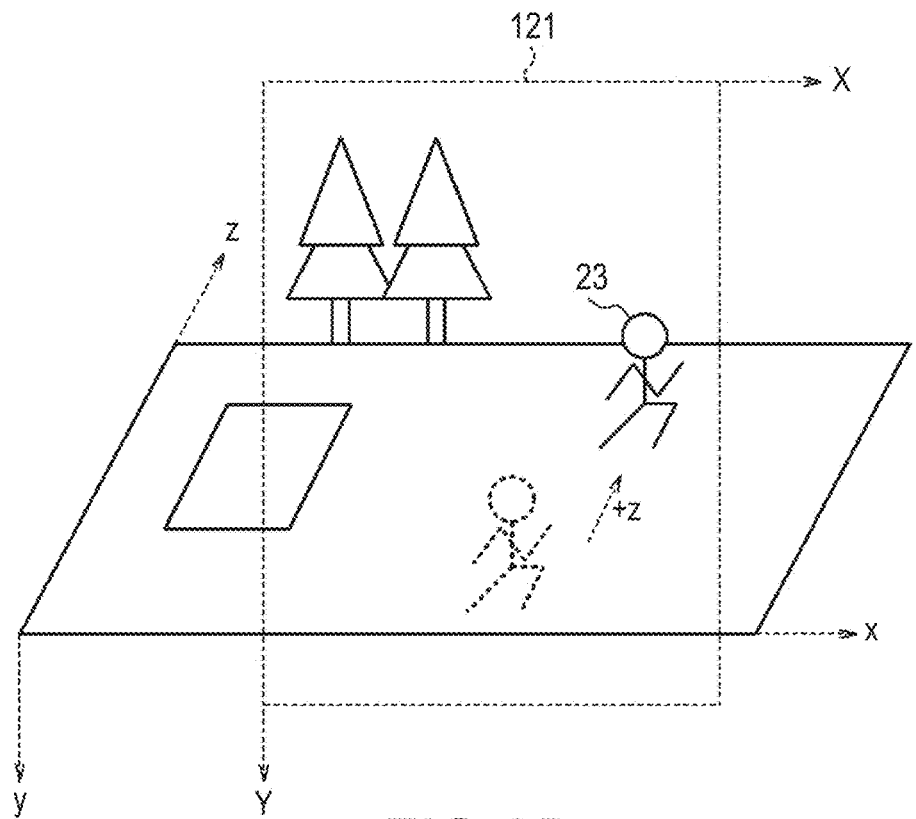
FIG. 3A is a diagram illustrating a virtual space of a game according to the present embodiment.
Figure 3B:
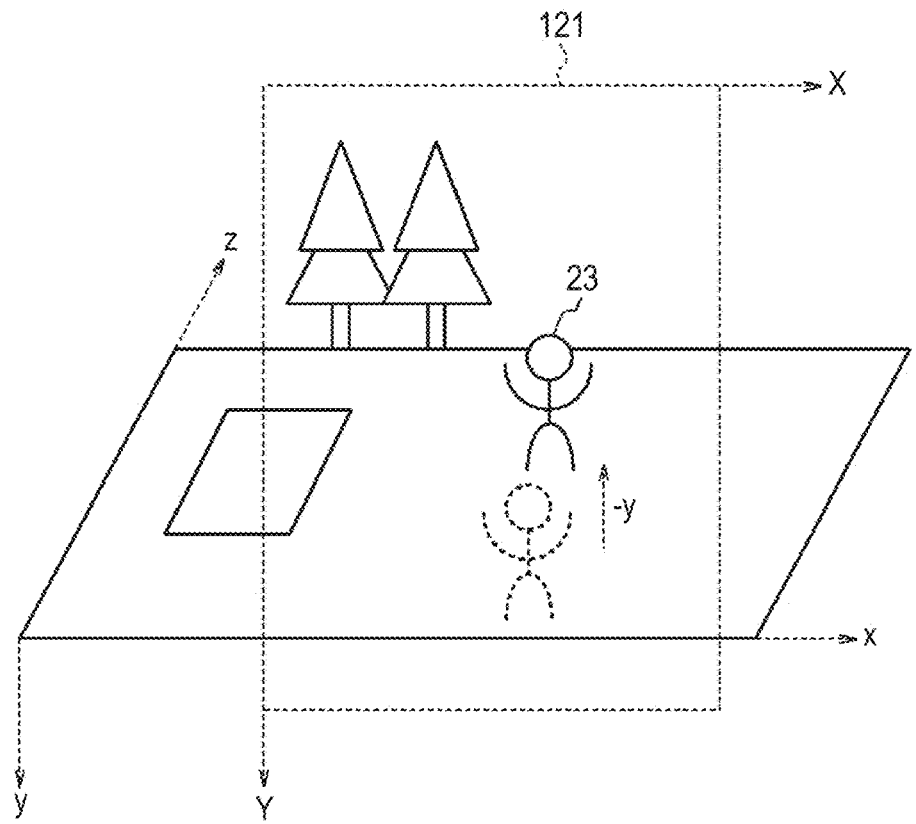
FIG. 3B is a diagram illustrating a virtual space of a game according to the present embodiment.

As illustrated in FIGS. 3A and 3B, the virtual space of the game of the present embodiment may be a three-dimensional space. A virtual camera may be arranged in the virtual space so that the user character may be projected, and the virtual space viewed from the virtual camera may be displayed on the display unit 12. For the sake of description, an x axis in a left-right direction, a y axis in a vertical direction (from a point of view of the virtual camera), and a z axis in a front-back direction may be set in the virtual space. The x axis, the y axis, and the z axis of the virtual space may be orthogonal to one other. In the game of the present exemplary embodiment, a positional relation may be set such that the x axis and the y axis of the virtual space may be parallel to the X axis in the horizontal direction of the screen and the Y axis in the vertical direction. The virtual camera may perform projection such that the user character may be looked down from a predetermined position (a constant height) in the y-axis direction. Further, the virtual camera may also project the passage along which the user character may be able to move, surrounding objects (for example, a tree and a building), and the enemy character. In the game of the present exemplary embodiment, the user character may move in the x-axis direction as the scenario progresses, and the virtual camera also may move in the x-axis direction within the virtual space in accordance with the movement. In other words, the virtual camera may move in parallel to the x axis while keeping a predetermined position in the y-axis direction.

Here, in the game of the present embodiment, the user character may be able to move in the z-axis direction (front-back direction) in the virtual space. FIG. 3A illustrates an aspect in which the user character may perform the step movement on the passage in the virtual space from the front side to the rear side (from the front side to the back side). The z-axis direction corresponds to a first direction of an exemplary embodiment. Further, in the game of the present embodiment, the user character may be able to jump in a negative y axis direction (upwards) in the virtual space. The user character who jumps does not move in the z-axis direction. FIG. 3B illustrates an aspect in which the user character jumps. The y-axis direction corresponds to a second direction. Here, a video of the virtual camera overlooking the user character may be displayed on the display unit 12 (see the first display region 121 in FIGS. 3A and 3B). Therefore, both the backward step movement and the jump of the user character may be viewed to the user as the movement of the user character mainly in the Y direction (vertical direction) of the screen.

In order to provide an intuitive operation according to a way in which the user sees, it may be preferable to associate both of the backward step movement and the jump of the user character with an operation of moving, for example, a finger upwards in the second display region 120. However, if two different operations may be allocated to one operation input in the virtual space, the user may be unable to perform an intended operation, and the operability may be likely to be lowered. If the second display region 120 may be divided into smaller regions, and operations may be allocated to the smaller regions as in the technology disclosed in JP-A-2007-130367, there may be a confusion between operations. The game of the present embodiment may include a battle with the enemy character. In the battle, an attack notice range of the enemy character (a damaged range) may be displayed. For example, the attack notice range may have a predetermined width in the z-axis direction. It may be important for the user to cause the user character to perform the backward step movement from the front side in order to escape from the attack notice range. However, if there is a confusion in an action, and the user character performs an nintentional jump, the user character may not move in the z-axis direction and may be unable to escape from the attack notice range. If this happens, the user may have an impression that the operability is poor, and the user may be likely to lose interest in the game. In this regard, the information processing apparatus 1 according to the present embodiment provides an interface in which respective actions may be associated with two input operations to be described later, and a confusion in an action may be prevented without lowering the operability.

(V Flick Operation)

Figure 4A:
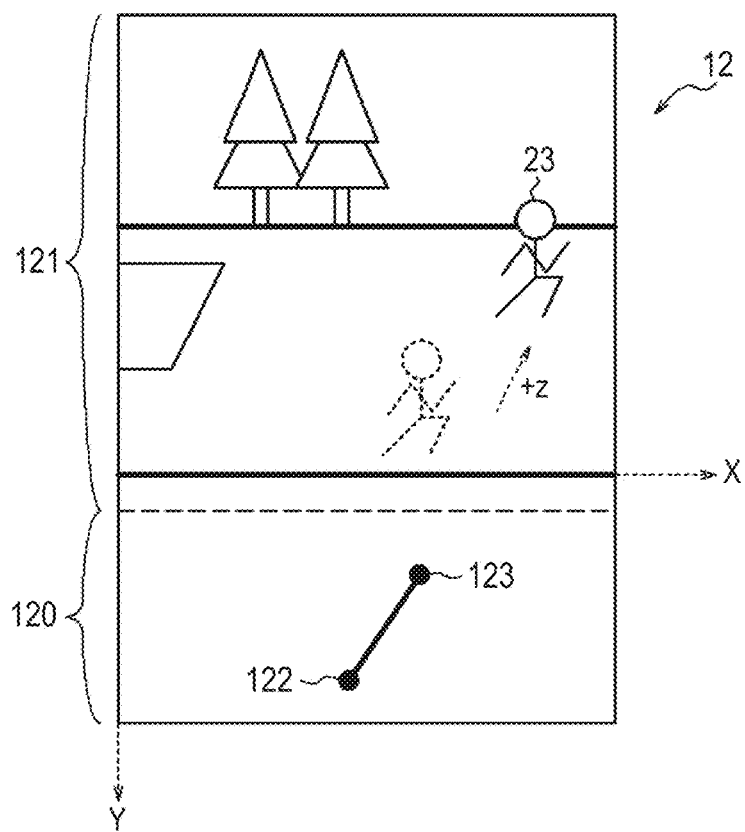
FIG. 4A is a diagram illustrating operation inputs used in a game according to the present embodiment.

FIG. 4A may show a diagram for describing the operation input corresponding to the backward step movement of the user character from the front side in the virtual space. When the user may perform the flick operation from a start point 122 to an end point 123 which may be in the negative Y-axis direction further than the start point 122 as illustrated in a second display region 120 of FIG. 4A, the user character may move the backward step movement from the front side. In the game of the present embodiment, for example, it may be possible to cause the user character to perform the step movement through the flick operation whose contact period of time on the touch panel may be shorter than the swipe operation. Therefore, it may be possible to implement excellent operability particularly in a battle stage in which rapid movement is necessary to avoid an attack from an enemy. It may be possible to adjust a distance of the step movement of the user character in the virtual space in accordance with a distance between the start point 122 and the end point 123 in the flick operation. The first display region 121 of FIG. 4A may be the same as the first display region 121 in FIG. 3A, and thus description thereof may be omitted. Further, in the second display region 120, when the user may perform the flick operation from the start point 122 to the end point 123 which may be in the positive Y-axis direction further than the start point 122, the user character may move the step movement in the opposite direction (forward direction).

Figure 4B:
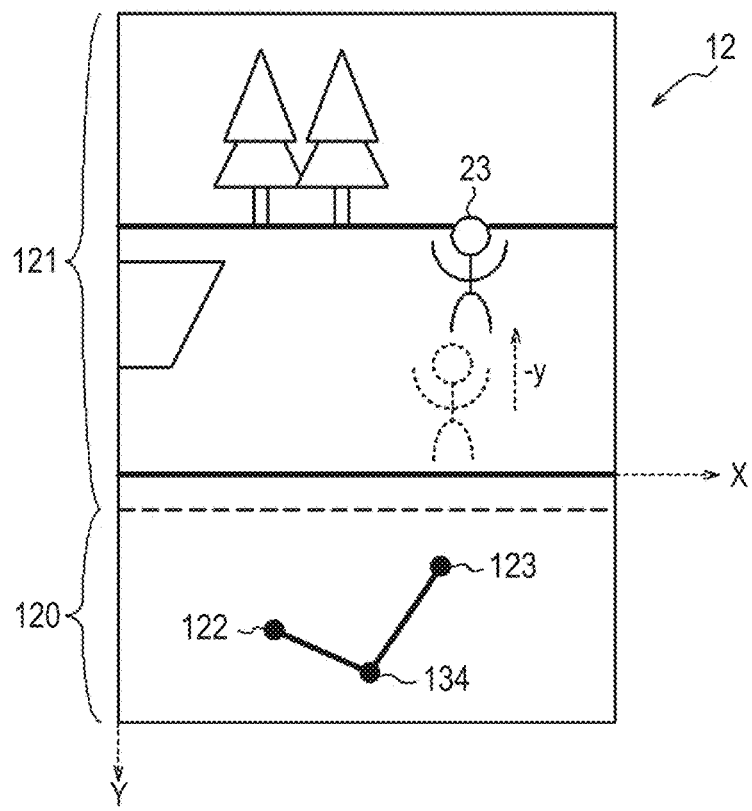
FIG. 4B is a diagram illustrating operation inputs used in a game according to the present embodiment.

FIG. 4B may show a diagram for describing an operation input corresponding to the jump of the user character in the virtual space. When the user performs the flick operation from a start point 122 to an end point 123 which may be in the negative Y-axis direction further than the start point 122 via an intermediate point 134 which may be in the positive Y-axis direction further than the start point 122 as illustrated in a second display region 120 of FIG. 4B, the user character may jump. Here, the operation input illustrated in FIG. 4B may also be a sort of the flick operation, but since the intermediate point 134 may be included, the trajectory may have a letter "V" shape. In this regard, in order to distinguish the flick operation from the normal flick operation illustrated in FIG. 4A, the flick operation of FIG. 4B may be referred to as a "V flick operation" in this specification. In the game of the present embodiment, it may also be possible to cause the user character to quickly jump in accordance with the V flick operation whose contact period of time on the touch panel may be shorter than the swipe operation. Therefore, it may be possible to implement the excellent operability particularly in the battle stage. The first display region 121 in FIG. 4B may be the same as the first display region 121 of FIG. 3B, and thus description thereof may be omitted. A method of adjusting a direction (moving direction) and a magnitude of the jump of the user character in virtual space which may be performed by the V flick operation may be described later.

(Determination of V Flick Operation)

Figure 5A:
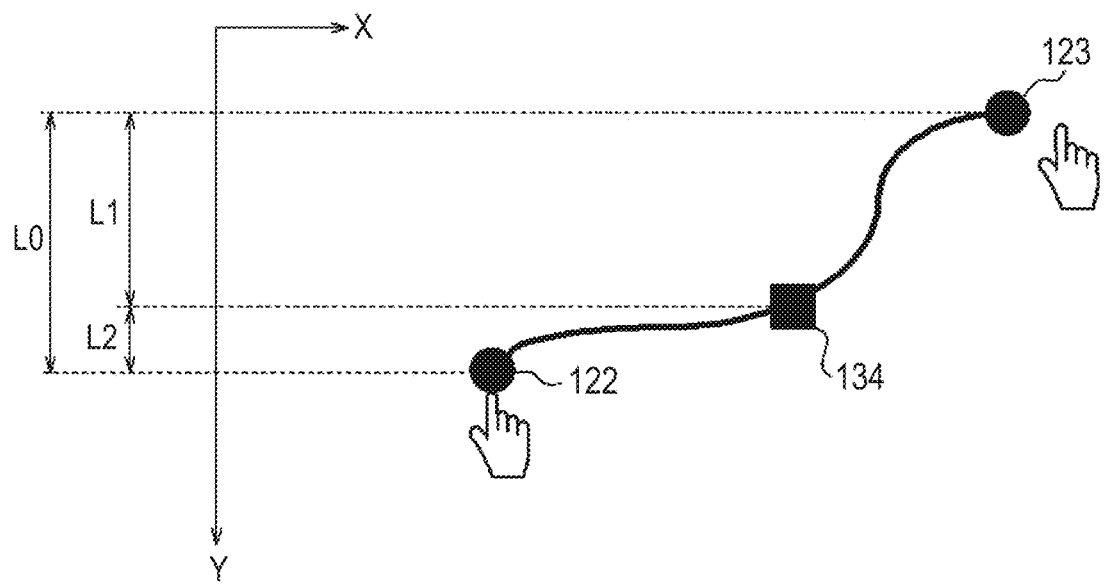
FIG. 5A is a diagram for describing a method of determining a normal flick operation and a V flick operation through a control unit.
Figure 5B:
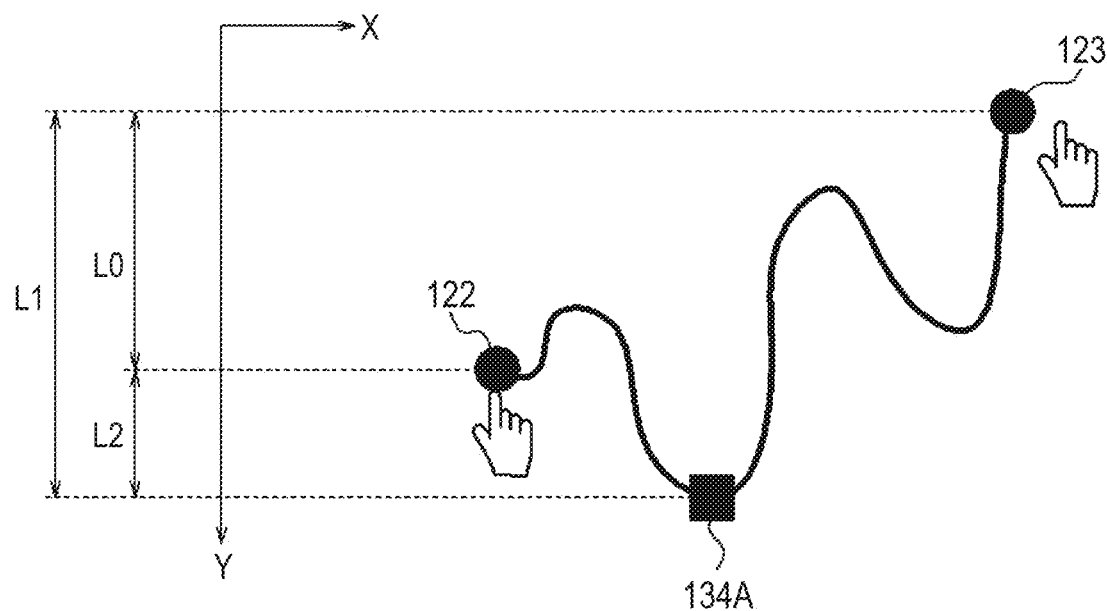
FIG. 5B is a diagram for describing a method of determining a normal flick operation and a V flick operation through a control unit.

FIGS. 5A and 5B may be diagrams for describing a method of determining the normal flick operation and the V flick operation through the control unit 13. The control unit 13 may retrieve coordinates of the start point, the intermediate point, and the end point of the input operation of the user from the input operation data of the storage unit 11. Then, a distance between the start point and the end point, a distance between the intermediate point and the end point, and a distance between the intermediate point and the start point in a predetermined direction (projection distances in a predetermined direction) may be calculated and compared. Here, in the game of the present embodiment, the predetermined direction may be a direction in which the user character may move on the screen through the jump or the step movement, which may be the Y-axis direction. Further, the V flick operation corresponds to a second input operation of an exemplary embodiment. Further, the normal flick operation other than the V flick operation corresponds to a first input operation of an exemplary embodiment.

In the example of FIG. 5A, the control unit 13 may be assumed to retrieve coordinates (X0, Y0) of the start point 122, the coordinates (X1, Y1) of the end point 123, and coordinates (Xa, Ya) of the intermediate point 134. The control unit 13 calculates a distance L0 ($|Y1-Y0|$ in the Y-axis direction between the start point 122 and the end point 123, a distance L1 ($|Y1-Ya|$) in the Y-axis direction between the intermediate point 134 and the end point 123, and a distance L2 ($|Ya-Y0|$) in the Y-axis direction between the intermediate point 134 and the start point 122. When the distance L1 or the distance L2 is larger than the distance L0, the control unit 13 may determine that the flick operation performed by the user may be the V flick operation. Conversely, when a condition that "the distance L1 or the distance L2 is larger than the distance L0" is not satisfied, the control unit 13 may determine that the flick operation performed by the user is the normal flick operation. In the example of FIG. 5A, since the distance L0 in the Y-axis direction between the start point 122 and the end point 123 is largest, the condition "the distance L1 or the distance L2 is larger than the distance L0" is not satisfied. Therefore, in the example of FIG. 5A, the control unit 13 may determine that the flick operation performed by the user is the normal flick operation.

Here, when there may be a plurality of intermediate points, the control unit 13 calculates the distance L1 and the distance L2 for each of the intermediate points. When the distance L1 or the distance L2 is larger than the distance L0 for at least one intermediate point, the control unit 13 may determine that the flick operation performed by the user is the V flick operation. Then, when the flick operation is determined to be the V flick operation, the control unit 13 may set one intermediate point whose distance L1 to the end point 123 in a predetermined direction (the Y-axis direction) is largest as a specific intermediate point. The specific intermediate point may be an intermediate point whose distance L2 the start point 122 in the Y-axis direction may be largest.

In the example of FIG. 5B, the control unit 13 may be assumed to retrieve coordinates (X0, Y0) of a start point 122, coordinates (X1, Y1) of an end point 123, and coordinates (Xb, Yb) of an intermediate point 134A. The control unit 13 may calculate a distance L0 ($|Y1-Y0|$) in the Y-axis direction between the start point 122 and the end point 123, a distance L1 ($|Y1-Yb|$) in the Y-axis direction between the intermediate point 134A and the end point 123, and a distance L2 ($|Yb-Y0|$) in the Y-axis direction between the intermediate point 134A and the start point 122. In the example of FIG. 5B, the distance L1 in the Y-axis direction between the intermediate point 134A and the end point 123 may be larger than the distance L0 in the Y-axis direction between the start point 122 and the end point 123. Since the condition that "the distance L1 or the distance L2 is larger than the distance L0" is satisfied, the control unit 13 may determine that the flick operation performed by the user is the V flick operation. The control unit 13 may cause the user character to jump in the virtual space.

In the example of FIG. 5B, the trajectory from the start point 122 to the end point 123 may have a local maximum value in the Y axis positive direction at the intermediate point 134A. In other words, the intermediate point 134A may be the specific intermediate point whose distance L1 from the end point 123 in the Y-axis direction may be largest in the trajectory from the start point 122 to the end point 123. The control unit 13 may adjust the direction (moving direction) and the magnitude of the jump of the user character in the virtual space on the basis of a relation between the specific intermediate point (the intermediate point 134A in the example of FIG. 5B) and the end point 123. Here, in the game of the present embodiment, the height (a displacement amount in the Y-axis direction) by which the user character jumps may be constant. Therefore, when the magnitude of the jump changes, the movement amount of the user character who may have jumped in the X-axis direction (the direction orthogonal to the Y-axis direction which may be the predetermined direction) changes. First, the control unit 13 may set a direction from the intermediate point 134A serving as the specific intermediate point to the end point 123 as the direction of the jump of the user character. For example, when the end point 123 may be on a rightward diagonal line extending from the intermediate point 134A with an angle of 60° in the X-axis direction, the control unit 13 may cause the user character to jump in the virtual space so that the user character jumps in a rightward diagonal direction with an angle of 60° in the X-axis direction in the screen of the display unit 12. Further, the control unit 13 may adjust the magnitude for moving the user character in accordance with the distance from the intermediate point 134A serving as the specific intermediate point to the end point 123. Therefore, as the distance between the intermediate point 134A and the end point 123 increases, the control unit 13 may increase the magnitude of the jump of the user character. The user may be able to easily adjust the direction and the magnitude of the jump by adjusting the positional relation between the intermediate point 134A serving as the specific intermediate point and end point 123 when causing the user character to jump through the V flick operation. The V flick operation may be handled as if it were the normal flick operation if the specific intermediate point is considered to be a new start point. Therefore, the user may be able to cause the user character to jump through an intuitive operation. Further, as described above, the control unit 13 may determine the normal flick operation and the V flick operation from a result of comparing the distance L0, the distance L1, and the distance L2 with one another. Therefore, the burden on the operation process may be small as well, and the control unit 13 may be able to quickly perform the determination process. Therefore, it may be particularly suitable for action games such as the game of the present embodiment in which a quick reaction of the user character according to the input operation of the user may be required.

(Flowchart)

Figure 6:
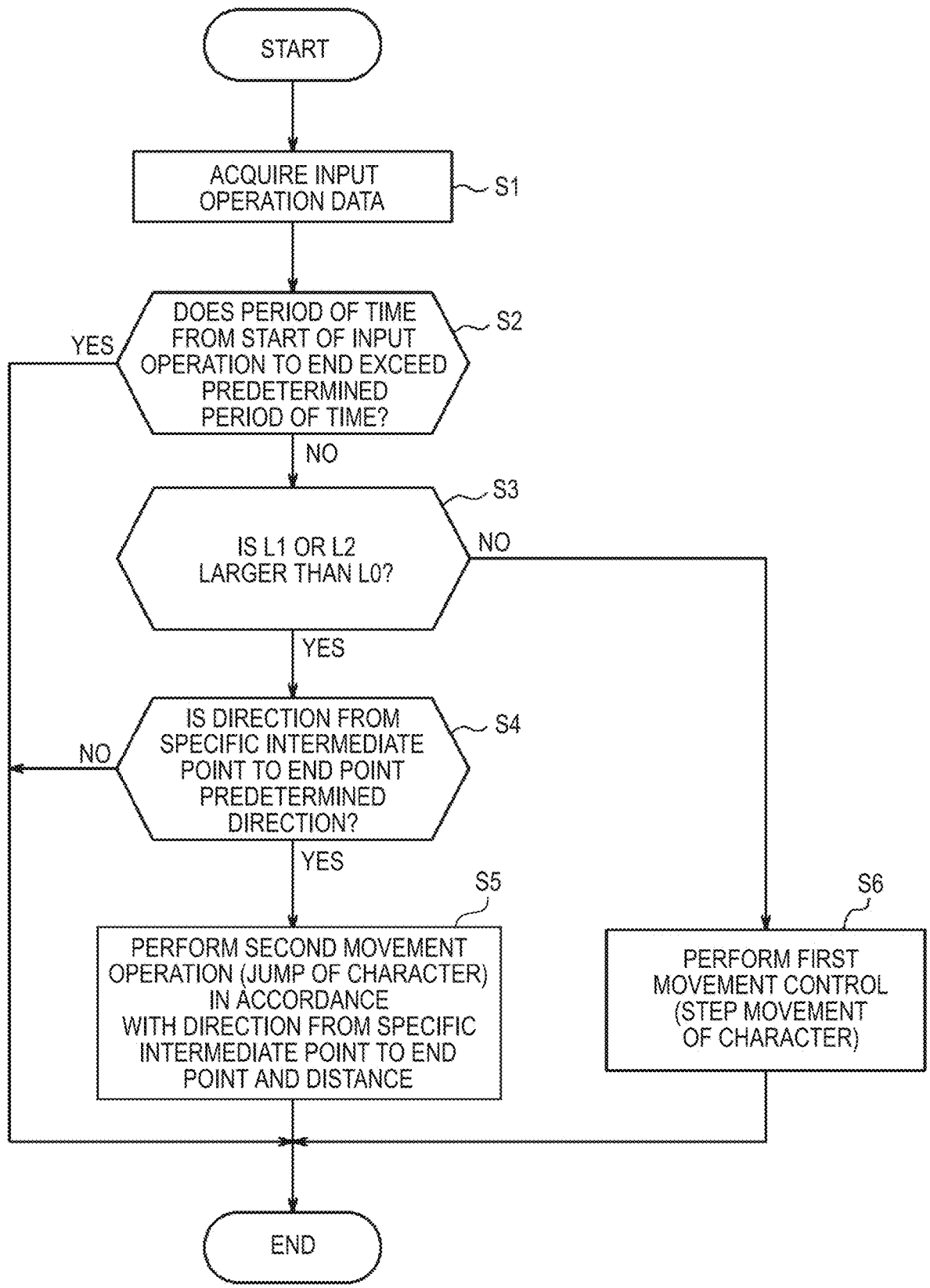
FIG. 6 is a flowchart illustrating a control method of determining a normal flick operation and a V flick operation.

FIG. 6 may show a flowchart illustrating a control method for determining the normal flick operation and the V flick operation. The control unit 13 may retrieve the input operation data from the storage unit 11 (step S1).

The control unit 13 may retrieve a period of time from the start of the input operation to the end from the input operation data and may determine whether or not the acquired period of time exceeds a predetermined period of time (step S2). The predetermined period of time may be, for example, one second. When the period of time from the start of the input operation to the end exceeds the predetermined period of time, that is, when the input operation is continued even after the predetermined period of time, the control unit 13 may determine that the input operation is not the flick operation (for example, when it is the swipe operation), and may end the present determination process (Yes in step S2). When the period of time from the start of the input operation to the end does not exceed the predetermined period of time, the control unit 13 may determine that the input operation is the flick operation and may cause the process to proceed to step S3 (No in step S2).

The control unit 13 may calculate the distance L0 in the Y-axis direction between the start point and the end point, the distance L1 in the Y-axis direction between the intermediate point and the end point, and the distance L2 in the Y-axis direction between the intermediate point and the start point from the input operation data. Then, the control unit 13 may determine whether or not a condition of "the distance L1 or the distance L2 is larger than the distance L0" is satisfied (step S3). When the condition is satisfied, the control unit 13 may determine that the input operation is the V flick operation and may cause the process to proceed to step S4 (Yes in step S3). When the condition is not satisfied, the control unit 13 may determine that the input operation is the normal flick operation and may cause the process to proceed to step S6 (No in step S3).

When the input operation is determined to be the V flick operation, the control unit 13 detects the specific intermediate point whose distance L1 to the end point in the Y-axis direction is largest among the intermediate points. Then, the control unit 13 may determine whether or not a direction from the specific intermediate point to the end point is a predetermined direction (step S4). In the game of the present embodiment, the predetermined direction may be a direction in which the user character is able to jump. Specifically, the predetermined direction may be the "negative Y-axis direction" (an upward direction on a plane of paper in the vertical direction in the example of the display unit 12 in FIG. 2). When a Y axis component of the direction from the specific intermediate point to the end point is a negative direction, the control unit 13 may cause the process to proceed to step S5 (Yes in step S4). When the Y axis component of the direction from the specific intermediate point to the end point is not a negative direction, the control unit 13 may end the present determination process (No in step S4) because it may be hard to jump the user character.

When it is determined that the input operation is the V flick operation, and that the user character may be able to jump, the control unit 13 may execute second movement control in accordance with the direction and the distance of the specific intermediate point and the end point (Step S5), and the present determination process may end. Here, the second movement control may be used to cause the user character to jump in the virtual space. Step S5 corresponds to a second movement step of an exemplary embodiment.

When the input operation may be determined to be the normal flick operation, the control unit 13 may execute first movement control (step S6) and may end the present determination process. Here, the first movement control may be a control to cause the user character to perform the step movement in the virtual space. Step S6 corresponds to a first movement step of an exemplary embodiment.

Figure 2:
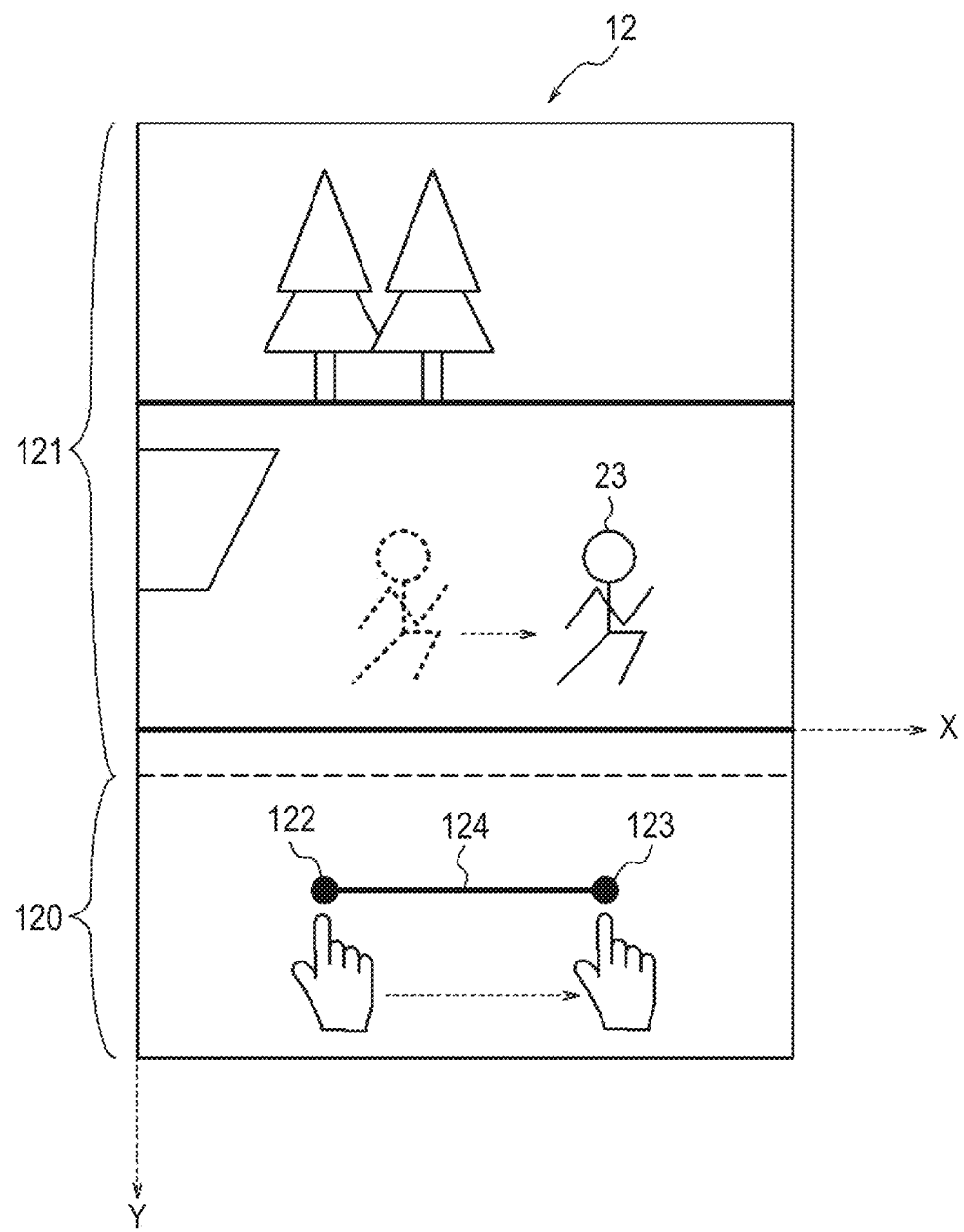
FIG. 2 is a diagram illustrating a virtual space displayed on a display unit.

Here, if the input operation is determined not to be the flick operation (for example, when it is the swipe operation), and the present determination process may end, the control unit 13 continues to perform a process of moving the user character on the passage (see FIG. 2).

As described above, the information processing apparatus 1 according to the present embodiment provides the user interface capable of preventing a confusion of two actions including movement of the user character in a predetermined direction (for example, the Y-axis direction) (for example, the backward step movement and the jump), and thus the game operability can be improved.

Here, in the game of the present embodiment, the normal flick operation and the V flick operation may be allocated to the two actions including the movement in the Y-axis direction on the screen (for example, the backward step movement and the jump). In other words, in the game of the present embodiment, when the moving direction of the user character is almost the same on the game screen seen by the user, but there are actions whose types may be different in the three-dimensional virtual game space, one operation may be allocated to the input operation (the V flick operation) different from the normal flick operation. On the other hand, a game in which different input operations may be allocated to a plurality of actions such as a close range attack, a magic attack, and a distant attack to the enemy character and a behavior of avoiding an attack from the enemy character may be known. However, such a game may require the user to memorize the individual input operations and corresponding behaviors of the user character. Further, when the user does not accurately understand a correspondence relation, the behavior of the user character becomes an unintended behavior. In the game of the present embodiment, the V flick operation may be allocated to one of two actions which may be the same in the moving direction of the user character on the screen, and thus it may be unnecessary to perform memorization of a plurality of input operations which may be burdensome to the user. Further, the V flick operation may give the user the same operation feeling as the normal flick operation if the specific intermediate point may be considered to be a new start point. Therefore, the user may be able to perform the intuitive operation in the game of the present exemplary embodiment.

It should be noted that an exemplary embodiment has been described with reference to the drawings and the embodiment, but those skilled in the art may be able to easily make various modifications or revisions on the basis of the present disclosure. Therefore, it should be noted that these modification or revisions fall within the scope of the invention. For example, the functions included in the respective means or steps may be rearranged so long as the rearrangement is logically consistent, and a plurality of means or steps may be combined into one or divided.

For example, in the embodiment, the normal flick operation and the V flick operation may be associated with the step movement and the jump of the user character, but they may be associated in an opposite manner. Further, the user may be able to select actions of the user character to be associated with the flick operation and the V flick operation through a game setting screen.

Further, for example, in the V flick operation of the embodiment, the input having the trajectory having the local maximum value in the positive Y-axis direction in the intermediate point may be used, but instead of or in conjunction with this, an input having a trajectory having a local maximum value in the negative Y-axis direction in the intermediate point may be used. At this time, for example, the user character may crouch in response to the V flick operation of the input having the trajectory having the local maximum value in the negative Y-axis direction.

Further, for example, in the V flick operation of the embodiment, the predetermined direction may be the Y axis or may alternatively be the X axis. In such an exemplary embodiment, for example, the game may be a race game, and when the user character moves in the positive z-axis direction in the virtual space and then moves in the x-axis direction, a course may be changed. In this case, in the case of the input having the trajectory having the local maximal value in the positive X-axis direction or the negative X-axis direction in the intermediate point, it may be determined to be the V flick operation. For example, the normal flick operation may be associated with a course change of the user character in the left or right direction, and the V flick operation may be associated with an attack (interference) to the enemy character running on the left or right sides of the user character.

Further, for example, in the game of the embodiment, the user character may be able to perform the step movement in the z-axis direction in the virtual space steplessly, but the step movement may be movement to an adjacent lane. In other words, the game of the embodiment may be a game in which the passage may be configured with a plurality of lanes extending in the x-axis direction in the virtual space, and the user character may move on any one lane.

Further, for example, in the embodiment, the control unit 13 may calculate so as to compare respective lengths of the distance L0, the distance L1, and the distance L2. However, in the process of determining the normal flick operation and the V flick operation, the distances may not be calculated, and values of coordinates of the start point and the end point in the predetermined direction (Y axis) may be compared with values of coordinates of the intermediate point in the predetermined direction (Y axis). Referring back to FIG. 5B, when the start point 122 and the end point 123 may be located in the same direction in the Y axis (the negative direction in the example of FIG. 5B) with respect to the intermediate point 134A, and the intermediate point 134A may be different from the start point 122 and the end point 123, it can be determined to be the V flick operation. For example, control unit 13 may be assumed to retrieve coordinates (X0, Y0) of the start point, coordinates (X1, Y1) of the end point, and coordinates (Xa, Ya) of the intermediate point. The coordinates of the intermediate point may be different from the coordinates of the start point and the coordinates of the end point. At this time, when the value Ya of the Y coordinate of the intermediate point is smaller than the value Y0 of the Y coordinate of the start point and the value Y1 of the Y coordinate of the end point, the control unit 13 may determine it to be the V flick operation. At this time, the control unit 13 may be able to perform faster determination since the computation load of the determination process may be reduced.

Further, for example, in the embodiment, the display unit 12 may include the first display region 121 and the second display region 120, but the display unit 12 may not be divided into two display regions.

For example, in the embodiment, the entire display unit 12 may be integrated with the operating unit 10 to constitute the touch panel. However, only a part of the display unit 12 (for example, the second display region 120) may be integrated with the operating unit 10 to constitute the touch panel.

Further, for example, in the embodiment, the operating unit 10 may be a touch panel, and may generate the input operation data using the coordinate system defined on the touch panel. However, the operating unit 10 may generate the input operation data from an operation of a virtual pad (for example, a virtual cross key) displayed on the touch panel. In other words, when the finger of the user touches the virtual pad, it may be defined as the start point, and when the finger of the user may be separated from the virtual pad, it may be defined as the end point, and the coordinate change or the intermediate point may be specified from a touched direction key during the time. Further, the operating unit 10 may be a controller having a physical cross key, a joystick, or the like.

Further, for example, in the game of the embodiment, the height at which the user character jumps (the displacement amount in the Y-axis direction) may be constant. Therefore, the moving distance of the user character who has jumped in the X-axis direction may be adjusted in accordance with the distance from the specific intermediate point of the V flick operation to the end point. However, the jumping height may be adjusted instead of the moving distance of the user character in the X-axis direction or together with the moving distance in the X-axis direction in accordance with the V flick operation.

In an exemplary embodiment, some of the various game screens may be displayed as a web display in which they may be displayed on the information processing apparatus 1 on the basis of data generated by a server apparatus capable of performing communication with the information processing apparatus 1, and some game screens (for example, a region in which a menu button may be arranged) may be displayed as a native display in which they may be displayed by a native application installed in the information processing apparatus 1. As described above, the game according to the embodiment may be a hybrid game in which each of the information processing apparatus 1 and the server apparatus undertakes some processes.

Further, an apparatus capable of executing information processing such as a computer or a mobile phone may be appropriately used to function as the information processing apparatus 1 according to the embodiment. These apparatuses can be implemented by storing a program describing processing content for implementing the functions of the information processing apparatus 1 according to the embodiment in the storage unit of the apparatus and reading and executing the program by a CPU of the apparatus.

What is claimed is:

1. A method for controlling a game executed by an information processing device having a touch panel display and a processor, wherein the method comprises executing, on the processor, steps of:
    displaying, on the touch panel display, a virtual 3D space, said virtual 3D space including a first direction, a second direction orthogonal to the first direction, and a third direction orthogonal to the first direction and the second direction;
    sequentially receiving, on the touch panel display, an input operation comprising a touch start position, a continuous touch trajectory extending between the touch start position and a touch end position, and the touch end position, wherein the touch start position comprises a first touch start position coordinate that is defined in the first direction and a second touch start position coordinate that is defined in the second direction, and wherein the touch end position comprises a first touch end position coordinate that is defined in the first direction and a second touch end position coordinate that is defined in the second direction;
    after the touch end position is received, determining a period of time between when the touch start position is received and when the touch end position is received, and comparing the period of time to a predetermined period of time;
    when the period of time does not exceed the predetermined period of time:
    determining that there is a difference between the second touch start position coordinate and the second touch end position coordinate, said difference between the second touch start position coordinate and the second touch end position coordinate being defined in either a positive second direction or a negative second direction;
    determining whether the continuous touch trajectory includes a direction change in the second direction;
    after determining that there is the difference between the second touch start position coordinate and the second touch end position coordinate, classifying the input operation as one of a first input operation or a second input operation, wherein classifying the input operation as the second input operation comprises determining that the continuous touch trajectory includes the direction change and classifying the input operation as the first input operation comprises determining that the continuous touch trajectory does not include the direction change; and
    when the input operation is the first input operation, triggering a first action of a game object, and when the input operation is the second input operation, triggering a second action of the game object;
    when the period of time exceeds the predetermined period of time:
    determining that there is a difference between the first touch start position coordinate and the first touch end position coordinate, said difference between the first touch start position coordinate and the first touch end position coordinate being defined in either a positive first direction or a negative first direction; and
    after determining that there is the difference between the first touch start position coordinate and the first touch end position coordinate, classifying the input operation as a third input operation and triggering a third action of the game object.

2. The method of claim 1, wherein the first action of the game object is a movement of the game object in a movement direction selected from one of: a movement in a positive third direction and a movement in a negative third direction, said selection based on whether the difference is defined in the positive second direction or the negative second direction.

3. The method of claim 1, wherein the second action of the game object comprises an interaction performed by the game object other than a movement.

4. The method of claim 3, wherein the second action of the game object comprises an attack action performed by the game object.

5. The method of claim 1, wherein the second action of the game object comprises a movement of the game object in a second movement direction, wherein the second movement direction does not include a component parallel to the third direction.

6. The method of claim 5, wherein the continuous touch trajectory extending between the touch start position and the touch end position further includes a midpoint defined between the touch start position and the touch end position, said midpoint being defined as a point having a largest distance, in the second direction, between the point and the touch end position; and
    wherein the second movement direction comprises a movement component parallel to the second direction, wherein a direction of the movement component is based on a direction between the midpoint and the touch end position.

7. The method of claim 5, wherein the continuous touch trajectory extending between the touch start position and the touch end position further includes a midpoint defined between the touch start position and the touch end position, said midpoint being defined as a point having a largest distance, in the second direction, between the point and the touch end position; and
    wherein the second movement direction comprises a movement component parallel to the first direction, wherein a magnitude of the movement component parallel to the first direction is based on a distance between the midpoint and the touch end position.

8. The method of claim 5, wherein the movement of the game object in the second movement direction comprises at least one movement component, the at least one movement component comprising a fixed movement amount provided in the second direction.

9. The method of claim 5, wherein the second action of the game object is a jump action of the game object.

10. The method of claim 1, wherein the third action of the game object comprises a movement of the game object in a direction parallel to the first direction.

11. An information processing device comprising a touch panel display and a processor, and configured to execute a game, wherein executing the game comprises executing steps of:
displaying, on the touch panel display, a virtual 3D space, said virtual 3D space including a first direction, a second direction orthogonal to the first direction, and a third direction orthogonal to the first direction and the second direction;
sequentially receiving, on the touch panel display, an input operation comprising a touch start position, a continuous touch trajectory extending between the touch start position and a touch end position, and the touch end position, wherein the touch start position comprises a first touch start position coordinate that is defined in the first direction and a second touch start position coordinate that is defined in the second direction, and wherein the touch end position comprises a first touch end position coordinate that is defined in the first direction and a second touch end position coordinate that is defined in the second direction;
after the touch end position is received, determining a period of time between when the touch start position is received and when the touch end position is received, and comparing the period of time to a predetermined period of time;
when the period of time does not exceed the predetermined period of time:
determining that there is a difference between the second touch start position coordinate and the second touch end position coordinate, said difference between the second touch start position coordinate and the second touch end position coordinate being defined in either a positive second direction or a negative second direction;
determining whether the continuous touch trajectory includes a direction change in the second direction;
after determining that there is the difference between the second touch start position coordinate and the second touch end position coordinate, classifying the input operation as one of a first input operation or a second input operation, wherein classifying the input operation as the second input operation comprises determining that the continuous touch trajectory includes the direction change and classifying the input operation as the first input operation comprises determining that the continuous touch trajectory does not include the direction change; and
when the input operation is the first input operation, triggering a first action of a game object, and when the input operation is the second input operation, triggering a second action of the game object;
when the period of time exceeds the predetermined period of time:
determining that there is a difference between the first touch start position coordinate and the first touch end position coordinate, said difference between the first touch start position coordinate and the first touch end position coordinate being defined in either a positive first direction or a negative first direction; and
after determining that there is the difference between the first touch start position coordinate and the first touch end position coordinate, classifying the input operation as a third input operation and triggering a third action of the game object.

12. The information processing device of claim 11, wherein the first action of the game object is a movement of the game object in a movement direction selected from one of: a movement in a positive third direction and a movement in a negative third direction, said selection based on whether the difference is defined in the positive second direction or the negative second direction.

13. The information processing device of claim 11, wherein the second action of the game object comprises an interaction performed by the game object other than a movement.

14. The information processing device of claim 13, wherein the second action of the game object comprises an attack action performed by the game object.

15. The information processing device of claim 11, wherein the second action of the game object comprises a movement of the game object in a second movement direction, wherein the second movement direction does not include a component parallel to the third direction.

16. The information processing device of claim 15, wherein the continuous touch trajectory extending between the touch start position and the touch end position further includes a midpoint defined between the touch start position and the touch end position, said midpoint being defined as a point having a largest distance, in the second direction, between the point and the touch end position; and
wherein the second movement direction comprises a movement component parallel to the second direction, wherein a direction of the movement component is based on a direction between the midpoint and the touch end position.

17. The information processing device of claim 15, wherein the continuous touch trajectory extending between the touch start position and the touch end position further includes a midpoint defined between the touch start position and the touch end position, said midpoint being defined as a point having a largest distance, in the second direction, between the point and the touch end position; and
wherein the second movement direction comprises a movement component parallel to the first direction, wherein a magnitude of the movement component parallel to the first direction is based on a distance between the midpoint and the touch end position.

18. The information processing device of claim 15, wherein the movement of the game object in the second movement direction comprises at least one movement component, the at least one movement component comprising a fixed movement amount provided in the second direction.

19. The information processing device of claim 11, wherein the third action of the game object comprises a movement of the game object in a direction parallel to the first direction.

20. A non-transitory computer-readable storage medium comprising program code that, when executed, causes an information processing device comprising a touch panel display and a processor to execute steps of:
displaying, on the touch panel display, a virtual 3D space, said virtual 3D space including a first direction, a second direction orthogonal to the first direction, and a third direction orthogonal to the first direction and the second direction;
sequentially receiving, on the touch panel display, an input operation comprising a touch start position, a continuous touch trajectory extending between the touch start position and a touch end position, and the touch end position, wherein the touch start position comprises a first touch start position coordinate that is defined in the first direction and a second touch start position coordinate that is defined in the second direction, and wherein the touch end position comprises a first touch end position coordinate that is defined in the first direction and a second touch end position coordinate that is defined in the second direction;

after the touch end position is received, determining a period of time between when the touch start position is received and when the touch end position is received, and comparing the period of time to a predetermined period of time;

when the period of time does not exceed the predetermined period of time:

determining that there is a difference between the second touch start position coordinate and the second touch end position coordinate, said difference between the second touch start position coordinate and the second touch end position coordinate being defined in either a positive second direction or a negative second direction;

determining whether the continuous touch trajectory includes a direction change in the second direction;

after determining that there is the difference between the second touch start position coordinate and the second touch end position coordinate, classifying the input operation as one of a first input operation or a second input operation, wherein classifying the input operation as the second input operation comprises determining that the continuous touch trajectory includes the direction change and classifying the input operation as the first input operation comprises determining that the continuous touch trajectory does not include the direction change; and when the input operation is the first input operation, triggering a first action of a game object, and when the input operation is the second input operation, triggering a second action of the game object;

when the period of time exceeds the predetermined period of time:

determining that there is a difference between the first touch start position coordinate and the first touch end position coordinate, said difference between the first touch start position coordinate and the first touch end position coordinate being defined in either a positive first direction or a negative first direction; and after determining that there is the difference between the first touch start position coordinate and the first touch end position coordinate, classifying the input operation as a third input operation and triggering a third action of the game object.

* * * * *